United States Patent [19]
Denz

[11] Patent Number: 5,592,922
[45] Date of Patent: Jan. 14, 1997

[54] VENTING APPARATUS FOR A FUEL SYSTEM OF AN INTERNAL COMBUSTION ENGINE

[75] Inventor: Helmut Denz, Stuttgart, Germany

[73] Assignee: Robert Bosch GmbH, Stuttgart, Germany

[21] Appl. No.: 404,696

[22] Filed: Mar. 15, 1995

[30] Foreign Application Priority Data

Mar. 16, 1994 [DE] Germany .......................... 44 08 869.8

[51] Int. Cl.⁶ .................................................. F02M 33/02
[52] U.S. Cl. ........................................... 123/520; 123/516
[58] Field of Search ..................................... 123/516, 518, 123/519, 520, 521, 198 D

[56] References Cited

U.S. PATENT DOCUMENTS

| | | | |
|---|---|---|---|
| 4,279,233 | 7/1981 | Tobita | 123/519 |
| 4,300,511 | 11/1981 | Lang | 123/520 |
| 4,598,686 | 7/1986 | Lupoli | 123/519 |
| 4,887,578 | 12/1989 | Woodcock | 123/519 |
| 5,386,811 | 2/1995 | Rochette | 123/519 |

FOREIGN PATENT DOCUMENTS

| | | | |
|---|---|---|---|
| 3927080 | 3/1991 | Germany . | |
| 0000544 | 1/1981 | Japan | 123/519 |
| 0104756 | 6/1985 | Japan | 123/519 |
| 4330358 | 11/1992 | Japan | 123/519 |
| 4330364 | 11/1992 | Japan | 123/519 |
| 5223020 | 8/1993 | Japan | 123/519 |

*Primary Examiner*—Carl S. Miller
*Attorney, Agent, or Firm*—Edwin E. Greigg; Ronald E. Greigg

[57] ABSTRACT

In the venting apparatus (1) according to the invention, a first, small-volume adsorption filter (4) is accommodated in the front area of a motor vehicle, in the region of the internal combustion engine and a second, large-volume adsorption filter (5) is accommodated in the region of a fuel tank (2). The fuel vapors evolved in the fuel tank (2) are introduced into the second adsorption filter (5) via a tank conduit (10) and into the first adsorption filter (4) via a connecting conduit (11) and, after flowing through the latter, into an intake pipe (20) of the internal combustion engine. The large-volume embodiment of the second adsorption filter (5) ensures that the fuel vapors evolved are reliably retained, and heating of the first adsorption filter (4) ensures that abrupt changes in the fuel/air mixture fed to the internal combustion engine are avoided.

11 Claims, 2 Drawing Sheets

VENTING APPARATUS FOR A FUEL SYSTEM OF AN INTERNAL COMBUSTION ENGINE

PRIOR ART

The invention is based on a venting apparatus for a fuel system of an internal combustion engine of the generic type of the main claim. A venting apparatus is already known (German Offenlegungsschrift 3,921,080) in which the fuel vapors which evolve in a fuel tank of an internal combustion engine are retained in two adsorption filters in order, for environmental reasons, to avoid emissions, especially hydrocarbon emissions, into the environment. In phases when the internal combustion engine is stationary or in operating ranges in which a regeneration valve of the venting apparatus is closed, the fuel vapors from the fuel tank initially flow via a tank conduit provided on the fuel tank into a small-volume adsorption filter and then via a connecting conduit into a large-volume adsorption filter. The fuel vapors from the fuel tank are for the most part retained, or adsorbed and temporarily stored, in the small-volume adsorption filter, and, as a result, this filter becomes heavily laden with fuel. Because of the limited capacity of adsorption filters, they must be regenerated or flushed with air. During the process of regeneration, the vacuum which arises in an intake pipe of the internal combustion engine causes air to be sucked into a large-volume adsorption filter from the environment via a ventilation conduit provided on the latter, and this air passes via the connecting conduit into the small-volume adsorption filter. In the process, the fuel stored in the adsorption filters is taken along and mixes with the air, whereupon the fuel vapors are fed to a regeneration valve via an extraction conduit provided on the small-volume adsorption filter and are passed from the said valve, via a valve conduit, into the intake pipe and are then burnt in at least one combustion space of the internal combustion engine. The regeneration valve inserted between the small-volume adsorption filter and the intake pipe and controlled by an electronic control unit here ensures that the fuel vapors are only introduced in selected operating ranges of the internal combustion engine in order to ensure, on the one hand, that the exhaust emissions of the internal combustion engine are not increased and, on the other hand, high smoothness of running of the internal combustion engine is maintained.

Since, in future, the environmental regulations imposed by the legislature, especially the Californian legislature, which prescribe extremely low limit values for the release of fuel vapors, can be expected to be made more severe, large-volume adsorption filters are required to meet the limit values. These limit values must not be exceeded either when refilling the fuel tank, or with the internal combustion engine switched off or during the operation of the internal combustion engine. In order to comply with these limit values and, in particular, for reasons of vehicle occupant safety, it is necessary to accommodate both adsorption filters in the vicinity of the fuel tank of the motor vehicle. In the case of the venting apparatus described at the outset, both the small-volume and the large-volume adsorption filter are for these reasons accommodated in the vicinity of the fuel tank, making a relatively long extraction conduit necessary to connect the small-volume adsorption filter to the regeneration valve accommodated in the region of the intake pipe. It would not be expedient to provide the small-volume adsorption filter in the vicinity of the internal combustion engine and the large-volume adsorption filter in the vicinity of the fuel tank since a relatively long tank conduit would then lead from the small-volume adsorption filter to the fuel tank and a relatively long connecting conduit would lead from the small-volume adsorption filter to the large-volume adsorption filter.

Even in the case of conventional venting apparatuses which have only a single adsorption filter in the vicinity of the fuel tank, a relatively long extraction conduit is required to connect the single adsorption filter to the regeneration valve accommodated in the region of the intake pipe, this conduit generally being laid along the vehicle underbody. Because of the relatively long length of the extraction conduit, fuel vapors can condense at cool points of the extraction conduit and, as a result, liquid fuel collects especially at siphon-trap-like points. There is the risk here that, with the regeneration valve open during regeneration, liquid fuel will be taken along from the extraction conduit in addition to the fuel vapor, in the event of a sudden rise in the quantity of purge air, for example in the case of an increase in the load on the internal combustion engine, and will pass from the regeneration valve, via the valve conduit, into the intake pipe, causing abrupt changes in the proportion of fuel in the fuel/air mixture introduced. These abrupt changes can increase the exhaust emissions of the internal combustion engine and cause disturbances in the performance.

ADVANTAGES OF THE INVENTION

In contrast, the venting apparatus according to the invention with the defining features of the main claim has the advantage that the fuel vapors emitted from the fuel tank are reliably retained both when the internal combustion engine is stationary and when it is being operated in certain operating ranges and, in particular, that abrupt changes in the proportion of fuel in the fuel/air mixture introduced are avoided.

Advantageous further developments and improvements of the venting apparatus specified in the main claim are possible by virtue of the measures presented in the subclaims.

DRAWINGS

Exemplary embodiments of the invention are depicted in simplified form in the drawing and explained in greater detail in the description which follows.

FIG. 1 shows a venting apparatus according to the invention in schematically simplified representation in accordance with a first exemplary embodiment, FIG. 2 shows a view of an alternative embodiment of a component of the venting apparatus according to the invention, in accordance with a second exemplary embodiment.

DESCRIPTION OF THE EXEMPLARY EMBODIMENT

Figure 1:
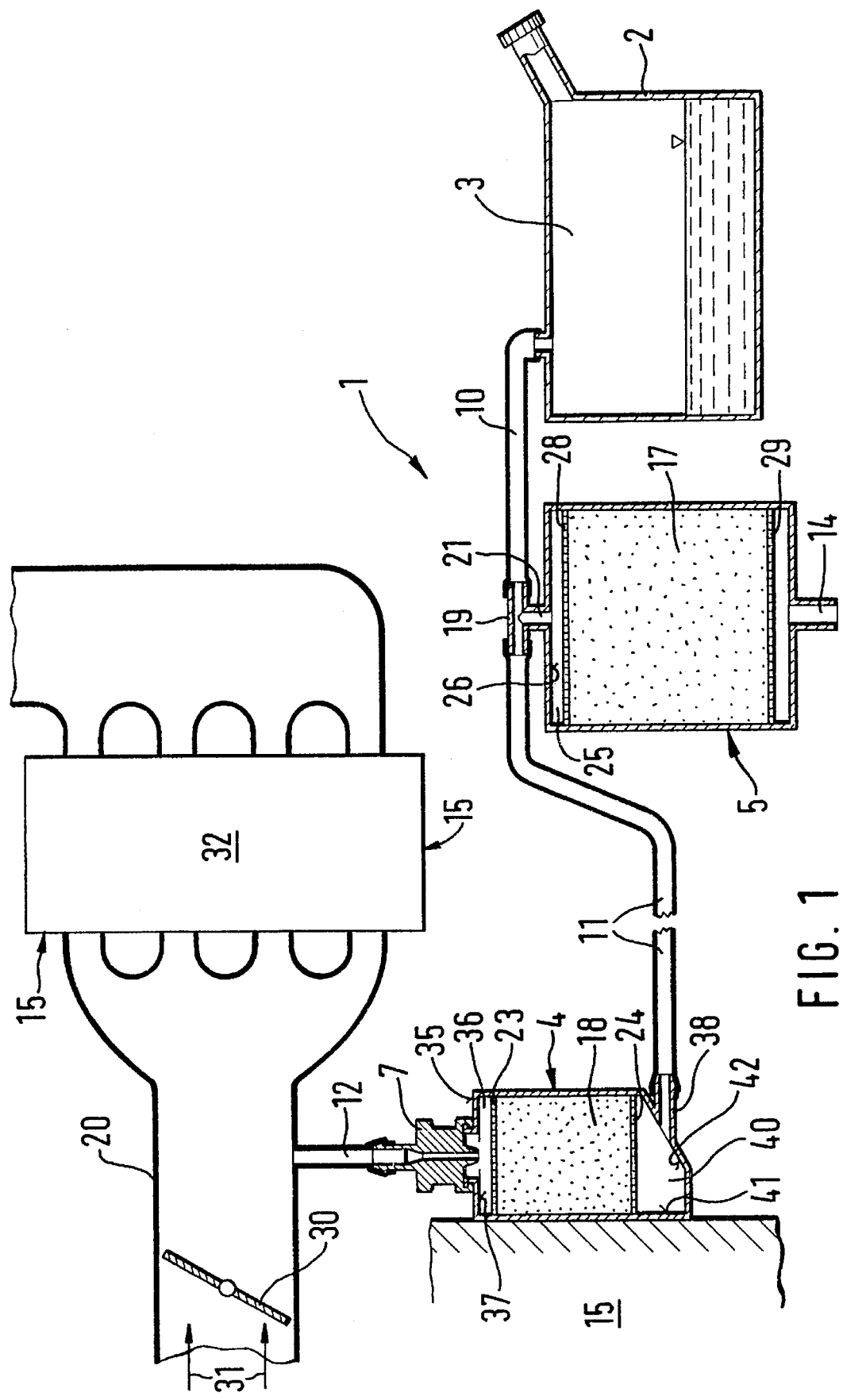

FIG. 1 shows schematically a venting apparatus, denoted by 1, for a fuel tank 2 used to supply an internal combustion engine (not shown in greater detail) with fuel. The venting apparatus 1 is intended, in particular, for installation in motor vehicles and has a first adsorption filter 4 and a second adsorption filter 5 connected to the latter via a connecting conduit 11. In the exemplary embodiment, the first adsorption filter 4 has an overall volume or storage capacity for fuel vapors which is smaller than the overall volume or storage capacity of the second adsorption filter 5. The adsorption filters 4, 5 are partially filled with an adsorption medium, in particular with activated carbon 17, 18, the activated carbon 17 of the first adsorption filter 4 being enclosed between two permeable boundary walls 23, 24 in the interior of the first adsorption filter 4 and the activated carbon 18 being enclosed between two permeable boundary walls 28, 29 in the interior of the second adsorption filter 5. The second adsorption filter 5, represented as having a large volume in FIG. 1 is, for example, designed with a so-called short-circuit construction in which two connection conduits, in the exemplary embodiment a tank conduit 10 of the fuel tank 2 and a connecting conduit 11 of both adsorption filters 4, 5 are connected directly to one another by means of a T-shaped connecting branch 19, with the result that there is only a single feed line 21 extending into a cavity 25 of the second adsorption filter 5 at the transition from the tank conduit 10 to the connecting conduit 11. The cavity 25 is bounded by the boundary wall 28 depicted above in FIG. 1 and by an inner wall 26 of the adsorption filter 5.

The first adsorption filter 4 is connected in a pluggable manner and, for example directly, without an extraction conduit, to a regeneration valve 7 such as shown by valve 45 in U.S. Pat. No. 5,178,116 which is incorporated by reference, the regeneration valve being connected to an intake pipe 20 of the internal combustion engine by means of a valve conduit 12. In phases when the internal combustion engine is stationary or in operating ranges in which the regeneration valve 7 is closed, the fuel vapors first of all flow from an internal space 3 of the fuel tank 2, via the tank conduit 10, into the second adsorption filter 5, where they are temporarily stored or adsorbed. In order to ensure that no fuel vapors can escape into the environment from the fuel tank 2 via a ventilation conduit 14 provided on the second adsorption filter 5, this filter has a relatively large overall volume and a high storage capacity for the fuel vapors to ensure that the fuel vapors can leave the second adsorption filter 5 only in filtered form, specifically as air. To take up the refueling emissions which occur during the refilling of the fuel tank 2 and particularly for reasons of vehicle occupant safety, it is necessary to accommodate the second adsorption filter 5 in the region of the fuel tank 2, the relatively short tank conduit 10 from the fuel tank 2 to the second adsorption filter 5 advantageously leading to only low flow resistances.

In dimensioning overall volume or storage capacity of the second adsorption filter 5, allowance must be made not only for the stationary phase of the internal combustion engine but, in particular, for driving operation since increased gassing of fuel occurs during driving operation. The increased gassing is caused in part by vibration movements of the fuel in the fuel tank 2 and in part by a fuel return to the fuel tank 2. The fuel return is provided for the purpose of pressure-regulating the injection valves of the internal combustion engine, which are supplied with fuel from the fuel tank 2. In this arrangement, excess fuel is, after flowing through a fuel feeder supplying the injection valves, fed back to the fuel tank 2 by means of a pressure regulator, but this fuel is warmer than the cool fuel in the fuel tank 2, with the result that increased gassing of fuel in the fuel tank 2 occurs during the operation of the internal combustion engine.

During the operation of the internal combustion engine, a vacuum prevails in the intake pipe 20 and, by means of this vacuum, the fuel vapors are extracted from the fuel tank 2 when the regeneration valve 7 is open. In this case, the fuel vapors pass from the fuel tank 2 via the tank conduit 10 and into the connecting conduit 11 at the connecting branch 19, air from the environment being sucked into the ventilation conduit 14 and the second adsorption filter 5 by the vacuum in the intake pipe 20, and the fuel stored in the activated carbon 17 being taken along. The air drawn in is thereby enriched with fuel and the second adsorption filter 5 is regenerated. The fuel/air mixture then flows out of the feed line 21 of the connecting branch 19, via the connecting conduit 11, into the first adsorption filter 4 and flows through the latter from the lower boundary wall 24 to the upper boundary wall 23 and fuel stored in the activated carbon 18 is additionally taken along. During this process, the proportion of fuel in the fuel/air mixture is increased again and the first adsorption filter 4 is likewise regenerated. After this, the fuel-enriched fuel/air mixture flows via the regeneration valve 7 and the valve conduit 12 into the intake pipe 20 downstream of a throttle valve 30. Flowing into the intake pipe 20 in the direction of the arrows 31 drawn in is a medium, for example air or a fuel/air mixture, which mixes with the fuel/air mixture introduced, after which the mixture is burnt downstream of the throttle valve 30 mounted rotatably in the intake pipe 20 in at least one combustion space 32 (depicted schematically in FIG. 1) of the internal combustion engine.

However, the introduction of the fuel/air mixture into the intake pipe 20 must only be performed selectively, i.e. only in selected operating ranges of the internal combustion engine in order to ensure, on the one hand, that exhaust emissions from the internal combustion engine are not increased and, on the other hand, that a high smoothness of running of the internal combustion engine is maintained. For this purpose, the regeneration valve 7 (which is, for example, electromagnetically actuable) inserted between the first adsorption filter 4 and the intake pipe 20 is controlled by an electronic control unit (not shown specifically), being opened occasionally to introduce into the intake pipe 20 a quantity of fuel dependent on operating parameters of the internal combustion engine, the quantity depending, inter alia, on the rotational speed of the internal combustion engine and the vacuum prevailing in the intake pipe 20.

As shown in FIG. 1, the regeneration valve 7 is mounted on an outer surface 35 of the first adsorption filter 4, in a pluggable manner for example, with the result that the fuel/air mixture passes directly into the regeneration valve 7, without an extraction conduit, from a cavity 36 of the first adsorption filter 4, the said cavity being enclosed by the upper boundary wall 23 and an inner wall 37 of the adsorption filter 4. It is also possible to provide the regeneration valve 7 separately, for which purpose an extraction conduit would additionally be required between the first adsorption filter 4 and the regeneration valve 7. According to the invention, the first adsorption filter 4 is accommodated in the front area of a motor vehicle, in the region of the internal combustion engine, whereas the second adsorption filter 5 is accommodated on the fuel tank 2 or in the vicinity of the latter, at the rear of the motor vehicle. The accommodation of the second adsorption filter 5 on the fuel tank 2 or in its vicinity is envisaged, on the one hand, because of the restricted space in the region of the internal combustion engine and, in particular, for reasons of vehicle occupant safety, the relatively short tank conduit 10 from the fuel tank 2 to the second adsorption filter 5 resulting in flow resistances which are only low. The connecting conduit 11 provided for the connection of both adsorption filters 4, 5 is relatively long, its length corresponding approximately to the length of the motor vehicle. The connecting conduit 11 is generally laid along the motor vehicle underbody, fuel vapors having the opportunity to condense especially at cool points in the connecting conduit 11 and collecting in the form of liquid fuel, especially at siphon-trap-like points in the connecting conduit 11. To prevent the liquid fuel from being introduced into the activated carbon 18 of the first adsorption filter 4 and via the regeneration valve 7 into the intake pipe 20 and hence leading to abrupt changes in the fuel/air mixture, the first adsorption filter 4 has, according to the invention, a storage space 40, this being shown below the permeable boundary wall 24 in FIG. 1. The storage space 40 is bounded by the boundary wall 24 and by an inner wall 42 of the first adsorption filter 4 and has a connection stub 38 to which the connecting conduit 11 is connected. The fuel/air mixture flowing in the connecting conduit 11 flows into the storage space 40 at a relatively high flow velocity and, in the storage space 40 flows at only a low flow velocity due to the increase in the cross section of flow, for reasons of continuity, allowing fuel to collect at the bottom, on the inner wall 42. According to the invention, the first adsorption filter 4 is accommodated at a heatable point in order to evaporate the liquid fuel that has collected in the storage space 40 as quickly as possible, for which purpose it is mounted in as good a thermally conductive contact as possible on, for example, a hot engine block 15 (depicted schematically in FIG. 1) of the internal combustion engine so that the liquid fuel in the storage space 40 is rapidly heated up and evaporated by means of a front face 41 of the inner wall 42 of the first adsorption filter 4, which face rests directly on the engine block 15. By means of the heatable storage space 40, penetration of liquid fuel which is taken along from a siphon-trap-like point in the connecting conduit 11 especially in the case of rapid load changes into the activated carbon 18 of the first adsorption filter 4 and hence a sudden increase in the fuel vapors introduced is advantageously avoided. The heating of the storage space 40 and the flow through the activated carbon 18 from the lower boundary wall 24 to the upper boundary wall 23 of the first adsorption filter 4 ensures that the fuel/air mixture introduced into the intake pipe 20 always has a constant proportion of fuel so that abrupt changes in the proportion of fuel in the fuel/air mixture flowing into the adsorption filter 4 lead at most to a delayed rise at the outlet of the first adsorption filter 4 or at the connection of the regeneration valve 7, without prejudicing the exhaust emissions from the internal combustion engine. It is, in particular, sufficient to make the second adsorption filter 5 of inexpensive short-circuit construction, making it possible to dispense with embodiments of so-called immersed-probe construction, which is associated with additional costs. An example of an embodiment of immersed-probe construction is disclosed by German Offenlegungsschrift 4,140,255, in which, in contrast to the short-circuit construction, both the tank conduit 10 and the connecting conduit 11 are each connected separately to the second adsorption filter 5 and thus only the tank conduit 10, for example, projects into the activated carbon 17.

Figure 2:
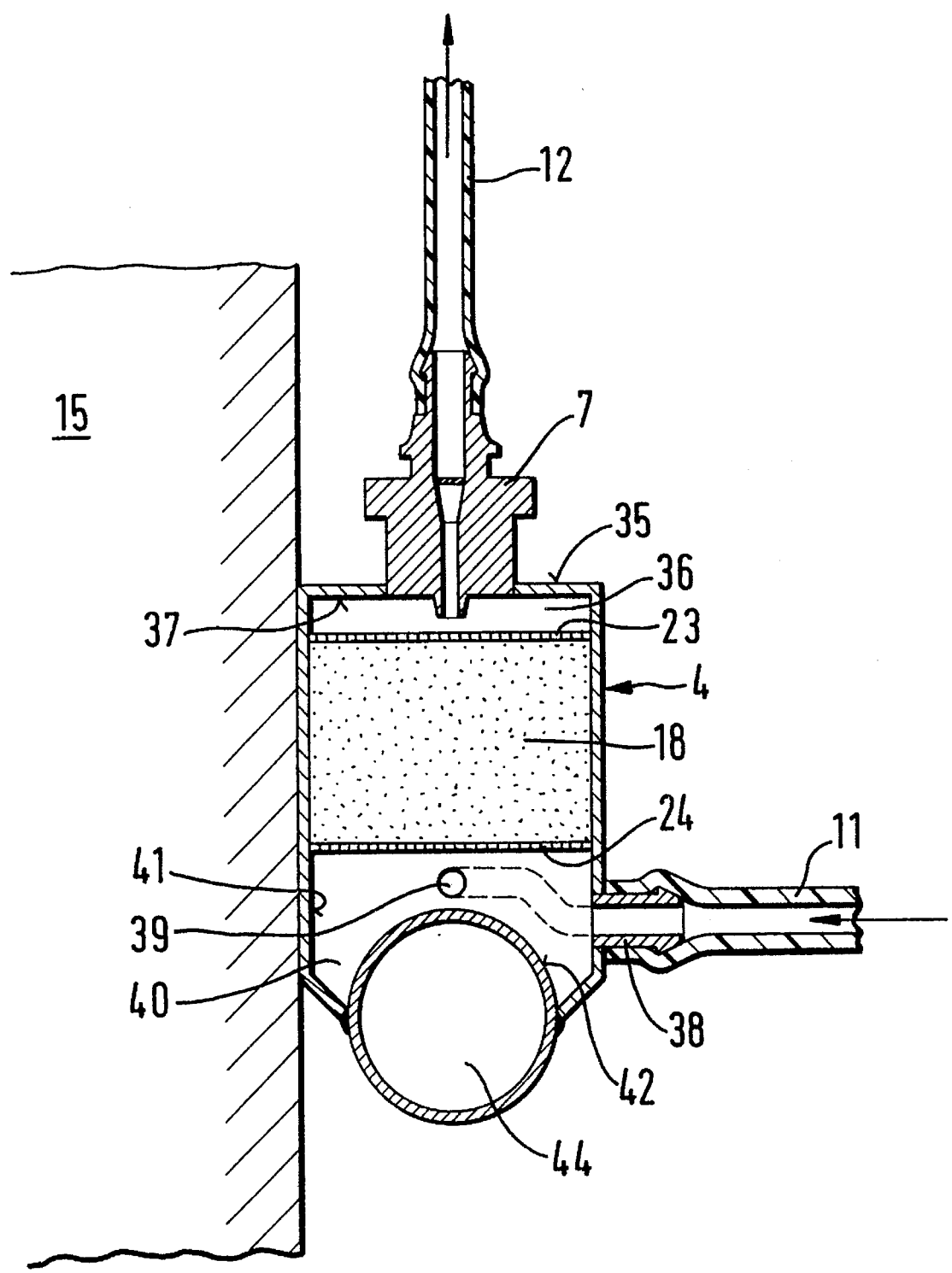

FIG. 2 shows an alternative embodiment of the first adsorption filter 4 of a second exemplary embodiment according to the invention of the venting apparatus 1, all parts which are the same or have the same action being denoted by the same reference symbols as in the first exemplary embodiment in FIG. 1. The first adsorption filter 4, which is shown in FIG. 2, has a storage space 40 which is penetrated, for example, by a coolant feed line 44 through which coolant heated by the internal combustion engine flows into the plane of the drawing of FIG. 2 or out of it in order in this way to heat the storage space 40 by as good a thermally conductive connection as possible. The heating of the storage space 40 by means of the coolant feed line 44 can, as shown in FIG. 2, be provided in addition to the mounting of the first adsorption filter 4 on the hot engine block 15 or can replace it. In accordance with the first exemplary embodiment, the storage space 40 is connected to the connecting conduit 11 via the connection stub 38, the fuel/air mixture or liquid fuel thus flowing into the collecting space 40 via an opening 39 of the connection stub 38 and collecting. In the collecting space, the condensed fuel is re-evaporated after a short time and flows in gaseous form into the activated carbon 18.

The construction of the venting apparatus i with the first adsorption filter 4 and the second adsorption filter 5 ensures that no fuel vapors can escape from the ventilation conduit 14 of the second adsorption filter 5 during prolonged stationary phases of the internal combustion engine, during driving operation of the internal combustion engine and in the case of severe heating of the fuel tank 2. In order to obtain adequate damping of the change in the proportion of fuel/air mixture introduced into the intake pipe 20, without abrupt increases, during the regeneration of the adsorption filters 4, 5, the overall volume of the second adsorption filter 5 or its storage capacity for fuel vapors should correspond at least to the overall volume of the first adsorption filter 4 or exceed it. The overall volume of the second adsorption filter 5 can, for example, be twice the overall volume of the first adsorption filter 4.

The foregoing relates to a preferred exemplary embodiment of the invention, it being understood that others variants and embodiments thereof are possible within the spirit and and scope of the invention, the latter being defined by the appended claims.

I claim:

1. A venting apparatus for a fuel system of an internal combustion engine comprising a fuel tank, in which fuel vapors evolved in the fuel tank are introduced into an intake pipe of the internal combustion engine via a regeneration valve connected to said intake pipe, said regeneration valve assumes an open position or a closed position, and to take up the fuel vapors, a first adsorption filter is connected to said regeneration valve and by a connecting conduit (11) to a second adsorption filter, said second adsorption filter is connected to the atmosphere only by a ventilation conduit and is accommodated in a region of the fuel tank (2), the first adsorption filter (4) is accommodated in a region of the internal combustion engine, and the fuel vapors from the fuel tank (2) pass into and flow through the second adsorption filter (5) in a closed position of the regeneration valve (7) and pass into and flow through the first adsorption filter (4) in the open position of the regeneration valve (7) and only the first adsorption filter (4) is connected to the intake pipe.

2. The venting apparatus as claimed in claim 1, wherein the first adsorption filter (4) has an overall volume which is smaller than an overall volume of the second adsorption filter (5).

3. The venting apparatus as claimed in claim 1, wherein the first adsorption filter (4) has a storage space (40) situated between the connecting conduit (11) and an adsorption medium (18).

4. The venting apparatus as claimed in claim 1, wherein the first adsorption filter (4) can be heated.

5. The venting apparatus as claimed in claim 1, wherein the first adsorption filter (4) and the regeneration valve (7) form a constructional unit.

6. The venting apparatus as claimed in claim 5, wherein the regeneration valve (7) is connected in pluggable fashion to the first adsorption filter (4).

7. The venting apparatus as claimed in claim 3, wherein the first adsorption filter (4) is mounted in thermally conductive contact on an engine block (15) of the internal combustion engine.

8. The venting apparatus as claimed in claim 3, wherein the storage space (40) is in thermally conductive contact with a heated medium of the internal combustion engine.

9. The venting apparatus as claimed in claim 1, wherein a tank conduit (10) is connected directly to the connecting conduit (11), and a feed line (21) connected to the second adsorption filter (5) is provided at the transition from the tank conduit (10) to the connecting conduit (11).

10. The venting apparatus as claimed in claim 2, wherein the second adsorption filter (5) has an overall volume which is at least approximately twice the overall volume of the first adsorption filter (4).

11. The venting apparatus as claimed in claim 4, wherein the first adsorption filter (4) is mounted in thermally conductive contact on an engine block (15) of the internal combustion engine.

* * * * *